G. BRODIE.
Cotton-Bale Ties.
No. 5,333.
Reissued March 25, 1873.
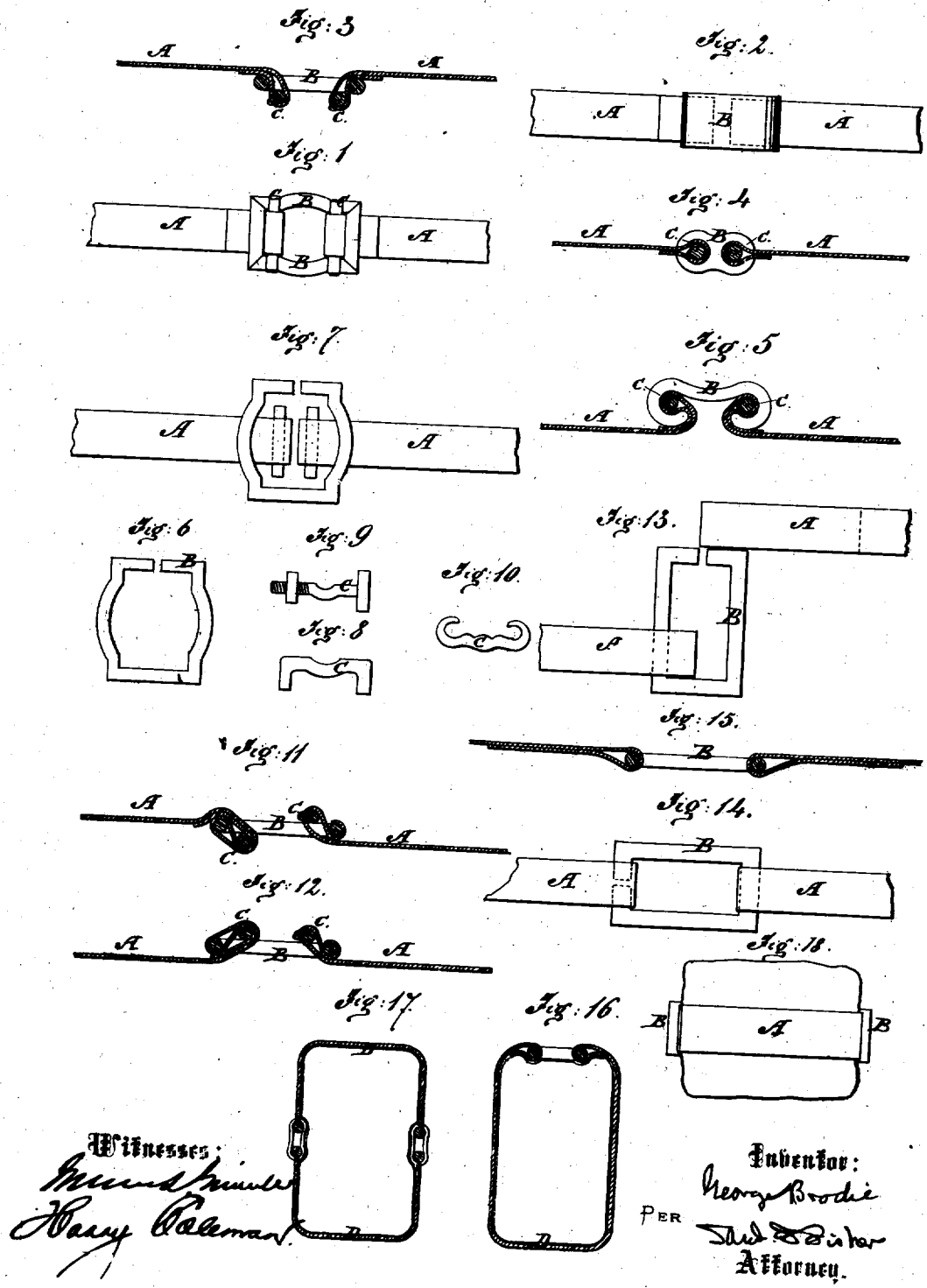
Witnesses:
Inventor:
George Brodie
PER
Attorney.

UNITED STATES PATENT OFFICE.

GEORGE BRODIE, OF PLUM BAYOU, ARKANSAS, ASSIGNOR TO JAMES JENNINGS McCOMB, OF LIVERPOOL, ENGLAND.

IMPROVEMENT IN COTTON-BALE TIES.

Specification forming part of Letters Patent No. 23,291, dated March 22, 1859; reissue No. 3,405, dated April 27, 1869; extended seven years; reissue No. 5,333, dated March 25, 1873.

*To all whom it may concern:*

Be it known that I, GEORGE BRODIE, of Plum Bayou, Jefferson county, Arkansas, have invented certain Improvements in Cotton-Ties or Metallic Bands and their Connections for Baling, of which the following is a specification:

My invention relates to the combination with open slot ties of metallic bands having their ends free, and held in position by the expansion of the bale.

Figure 1 is a top view of one form of my improvement. Fig. 2 is a top view of another form of my improvement. Fig. 3 is a vertical section of the device represented in Fig. 1. Figs. 4 and 5 are similar sections with connecting-links of different forms. Fig. 6 is a top view of the open slotted link, shown in Figs. 7, 13, and 14. Figs. 11, 12, 15, and 16 represent other modifications of the tie.

In Fig. 1 the band is held in place by means of pins inserted in loops at each end. The ends of the band with the inserted pins are brought together and the tie is slipped over them, as shown in Fig. 7, and then turned, as in Figs. 1 and 3; or the curve may be wide enough, as shown in Fig. 7, to permit the ends of the pins to pass it in the middle part without turning, while they are caught and held by the sides of the tie near the end.

Another mode of using the pins is shown in Figs. 11 and 12, where the band is folded upon itself, and thus passed double around the pins C, so as to give additional strength to the bend, and permit the use of lighter bands.

Figs. 6, 7, 13, and 14 show an open slotted link or tie. In Fig. 7 this is shown in connection with pins, and in Figs. 13, 14, and 15 in connection with the band alone, the ends being turned under the link and held in position by the pressure exerted by the expansion of the bale. In the latter mode of use the slack may be readily taken up by forming the loop in the iron at the moment of making the fastening, and passing the end thus looped through the opening in the side of the link. The band is thus slipped sidewise through the opening into the slot, instead of thrusting it through endwise.

What I claim as my invention is—

1. The swell or curve in the link, for the purpose of facilitating the introduction of the bands with their inserted pins, substantially as described.

2. The double lap of the band, as shown in Figs. 11 and 12, in combination with a metallic link.

3. The combination of an open slot for introducing the band sidewise, with a link having a single rectangular opening for holding both ends of a metallic band, and the band.

4. An open slotted link, when combined with metallic bands, the ends of which are turned under the link and held in position by the expansion of the bale.

5. The method of baling cotton with metallic bands, and of taking up the slack of the band by bending the same at any desired point into the form of a loop and passing such loop sidewise through an open slit into the slot intended to receive it and over the bar of the clasp intended to hold it.

GEORGE BRODIE.

Witnesses:

JAMES S. GRINNELL,
HARRY COLEMAN.